United States Patent
Martin

(10) Patent No.: US 10,989,834 B2
(45) Date of Patent: Apr. 27, 2021

(54) IDENTIFYING SUBTERRANEAN STRUCTURES USING AMORPHOUS METAL MARKERS

(71) Applicant: Energy and Environmental Research Center Foundation, Grand Forks, ND (US)

(72) Inventor: Christopher Lee Martin, Grand Forks, ND (US)

(73) Assignee: Energy & Environmental Research Center, Grand Forks, ND (US)

( * ) Notice: Subject to any disclaimer, the term of this patent is extended or adjusted under 35 U.S.C. 154(b) by 408 days.

(21) Appl. No.: 15/796,383

(22) Filed: Oct. 27, 2017

(65) Prior Publication Data
US 2019/0129064 A1  May 2, 2019

(51) Int. Cl.
| | | |
|---|---|---|
| *F16L 1/11* | (2006.01) | |
| *G01V 15/00* | (2006.01) | |
| *G01V 3/08* | (2006.01) | |
| *E02F 5/00* | (2006.01) | |
| *F16L 9/12* | (2006.01) | |

(52) U.S. Cl.
CPC ............ *G01V 15/00* (2013.01); *E02F 5/00* (2013.01); *F16L 1/11* (2013.01); *G01V 3/087* (2013.01); *F16L 9/125* (2013.01)

(58) Field of Classification Search
CPC ................................. G01V 15/00; F16L 1/11
See application file for complete search history.

(56) References Cited

U.S. PATENT DOCUMENTS

| | | | |
|---|---|---|---|
| 3,633,533 A * | 1/1972 | Allen ................. | H02G 9/025 116/200 |
| 4,745,401 A | 5/1988 | Montean | |
| 5,037,494 A | 8/1991 | Hilzinger et al. | |
| 5,051,034 A * | 9/1991 | Goodman .............. | F16L 1/11 405/157 |
| 5,532,598 A | 7/1996 | Clark, Jr. et al. | |
| 6,812,707 B2 | 11/2004 | Yonezawa et al. | |
| 8,610,429 B2 | 12/2013 | Nagasaki et al. | |
| 9,013,274 B2 | 4/2015 | Doany et al. | |
| 2009/0114304 A1* | 5/2009 | Mohri .................. | F16L 11/15 138/138 |

(Continued)

OTHER PUBLICATIONS

Belloir, F., et al., "A smart flat-coil eddy-current sensor for metal-tag recognition", Meas. Sci. Technol. 11 (2000) 1-8., (2000), 10 pgs.

(Continued)

*Primary Examiner* — Alesa Allgood
(74) *Attorney, Agent, or Firm* — Schwegman Lundberg & Woessner, P.A.

(57) ABSTRACT

Disclosed are methods and apparatus for identifying non-metallic subterranean structures using amorphous metal markers associated with the structures. Some examples will include the amorphous metal in the form of one or more sections of an amorphous metal foil within a protective enclosure sufficient to physically isolate the amorphous metal foil from the surrounding Earth. The amorphous metal foil and enclosure may be in the form of a tape which either will be secured to, or placed proximate the subterranean structure, which may be, for example, a pipe or conduit, or other non-metallic structure.

18 Claims, 9 Drawing Sheets

(56) References Cited

U.S. PATENT DOCUMENTS

2010/0109670 A1* 5/2010 Arnaud .................. G01V 15/00
324/326

OTHER PUBLICATIONS

Breiner, S., et al., "Applications Manual for Portable Magnetometers", Geometrics, (1999), 58 pgs.
Reeves, Colin, "Magnetometers and aircraft installations", Excerpt from Aeromagnetic Survey by Geosoft, (Oct. 2005), 33 pgs.
Shi, Yan, et al., "Theory and Application of Magnetic Flux Leakage Pipeline Detection", Sensors 2015, 15, 31036-31055; doi:10.3390/s151229845, (20 pgs), 2015.
Zitouni, Adel, et al., "Pipe Identification by Optimized Eddy Current Sensor", (May 2004), 6 pgs.

* cited by examiner

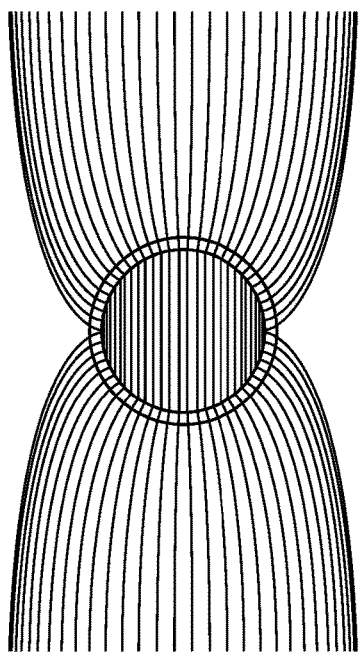
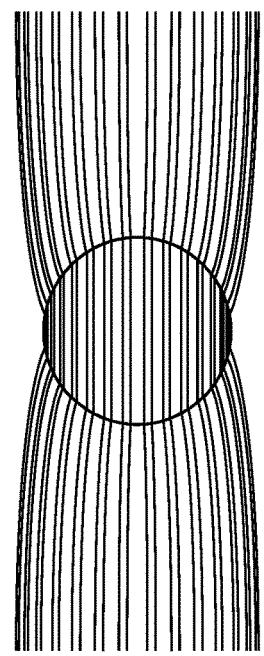
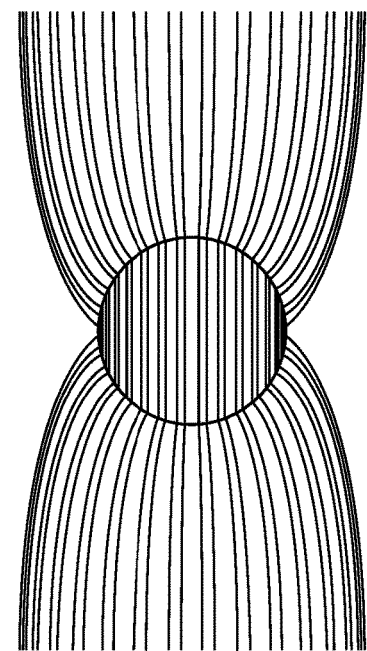
FIG. 4A  FIG. 4B  FIG. 4C
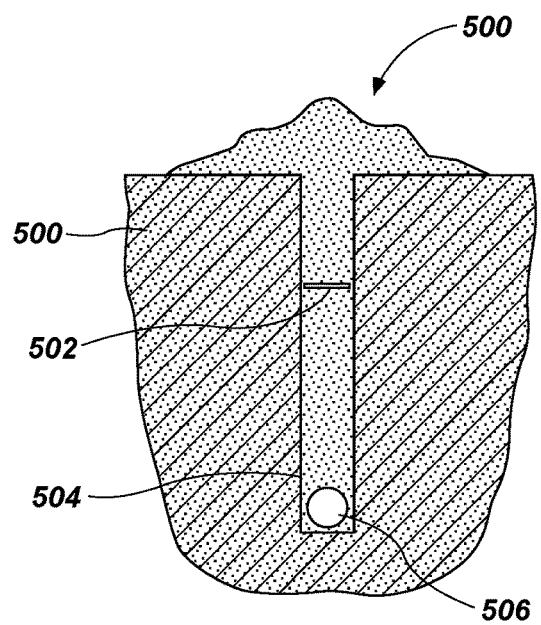
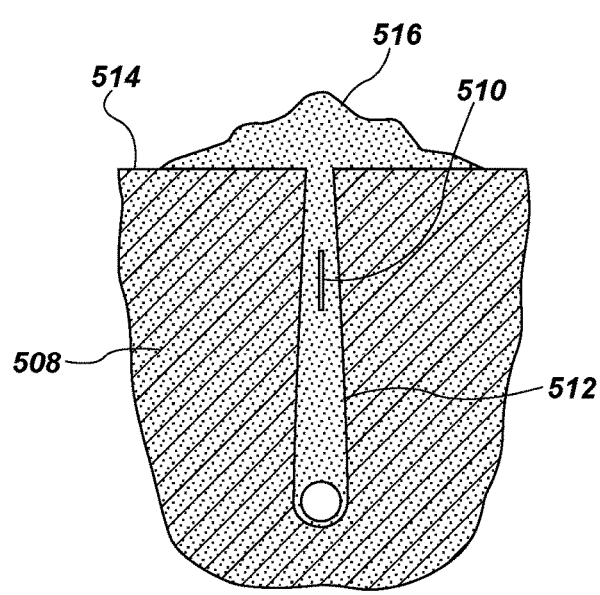
FIG. 5A  FIG. 5B

IDENTIFYING SUBTERRANEAN STRUCTURES USING AMORPHOUS METAL MARKERS

FIELD OF THE INVENTION

The present disclosure relates generally to methods and apparatus for identifying subterranean structures using amorphous metal markers associated with the structures; and more specifically relates to methods and apparatus for establishing location indicators for non-metallic structures, such as non-metallic pipes or pipelines, tanks, etc. through use of amorphous metal markers, such as sections of amorphous metal foil.

BACKGROUND OF THE INVENTION

A long-standing problem has been that of reliably identifying the location of subterranean structures, particularly when the structures are non-metallic, and therefore do not have a magnetic signature that can be detected; these items are also non-conductive and cannot be found using conductive or induced current techniques. One common example of such a structure is underground non-metallic conduit, for example such as PVC or polyethylene pipe or tubing. Although PVC and polyethylene pipe are common structures that need to be identified, similar problems can exist with buried clay, ceramic, or concrete structures. Additionally, structures other than pipe can present similar concerns, such as for example non-metallic electrical conduit, irrigation tubing, fiberglass or other non-metallic underground storage tanks, septic system components, drainage structures, etc. Identifying the presence and location of such structures can be important when trying to locate the structures for repair or evaluation, or when digging or otherwise disturbing the earth in the area, as when placing or building new structures.

Various techniques have been proposed over the past 50 years for addressing such problem. These have included placing of a colored plastic sheet or tape over the pipe or other structure to provide a visible indicator of an underlying structure. A disadvantage of such a system, however, is that the surrounding Earth must be disturbed to locate the plastic sheet or tape.

In some prior art systems, a tape structure including a metal film combined with a colored polymer material has been utilized to provide a visual indicator of the material, if exposed, while enabling detection of the metal. Such metal films are typically aluminum, copper, nickel, or a ferrous metal (or alloys of such materials). Conventional systems utilizing such a conventional metal film tape do not provide suitable detectable signature unless an electrical current is introduced through the metal film to establish a magnetic field that can then be detected. Introducing such an electrical current into a conventional marking tape can be problematic, as it either requires access to one end of the metallized tape (for conductive locating) or electrical coupling between the tape and the detector (for inductive locating). For the conductive locating, the ability to detect the tape depends upon the tape remaining intact to maintain the conductive path.

In some systems, tags of various configurations have been proposed for attaching to non-metallic structures. One such tag that has been proposed includes identifying information represented by patterns of magnetically permeable material (such as nanocrystalline or amorphous metals or metal alloys), formed in the tag, and configured to be excited by an alternating magnetic field of a selected frequency to provide a nonlinear response including a detectable fundamental frequency and multiple harmonic frequencies. The detector for interrogating such tags is relatively complex, requiring phase difference detection between an emitting coil signal and a receiving coil signal. Such a system is described in F. Belloir et. al, "*A Smart Flat-Coil Eddy-Current Sensor for Metal-Tag Recognition*" Measurement Science & Technology; vol. 11, no. 4, pp. 367-374. In other systems, multiple receiving coils may be utilized. A Zitouni, et. al., "*Pipe Identification by Optimized Eddy Current Sensor*" Additionally, such systems require matching of the excitation signal with the characteristics of the coding of the tag (which may not always be known), and require emitting a signal with sufficient energy to saturate the tag to generate the characteristic eddy currents that may be detected.

BRIEF DESCRIPTION OF THE DRAWINGS

FIGS. 3A-3C schematically depict respective contemplated applications including an amorphous metal tape, in which: FIG. 3A depicts amorphous metal tape extending circumferentially around a non-metallic conduit at spaced intervals; FIG. 3B depicts amorphous metal tape extending circumferentially around and along a section of a non-metallic conduit; and FIG. 3C depicts an amorphous metal tape secured adjacent a vertically-defined half-circumference of a non-metallic conduit.

FIGS. 4A-4C depict magnetostatic modeling of the distortion caused by a pipe cross-section in the Earth's magnetic field, wherein: FIG. 4A depicts distortion caused by a 4-inch iron pipe; FIG. 4B depicts distortion caused by a 50 μm shell of cast-iron around a 4-inch non-metallic pipe diameter; and FIG. 4C depicts distortion caused by a 50 μm shell of an amorphous metal film around a 4-inch non-metallic pipe diameter.

FIGS. 5A-5B depict alternative placements of an amorphous metal film in contemplated applications, in which: FIG. 5A depicts installation of an amorphous metal film in a generally horizontal orientation above a non-metallic conduit in a formed trench; and FIG. 5B depicts installation of an amorphous metal film in a generally vertical orientation above a non-metallic conduit in a plowed conduit recess.

DETAILED DESCRIPTION OF THE INVENTION

Figure 1:
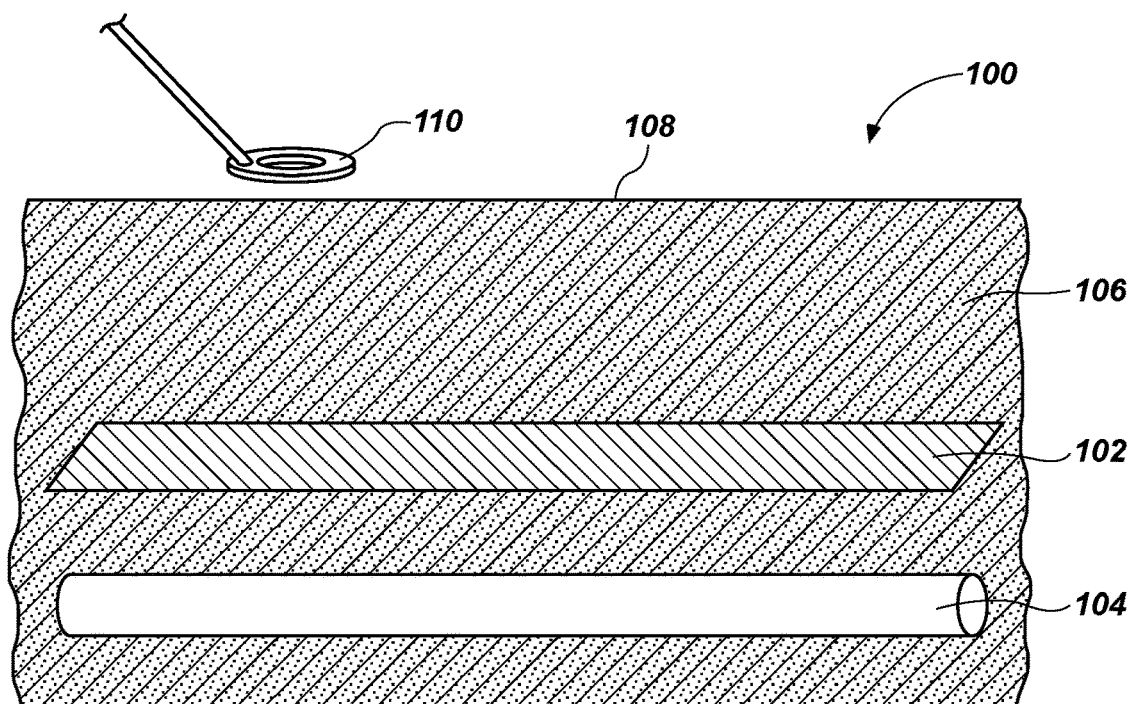
FIG. 1 depicts an example installation including an amorphous metal foil marking tape in one contemplated application.

The following description and the drawings sufficiently illustrate specific embodiments to enable those skilled in the art to practice them. Portions and features of some embodiments described herein may be included in, or substituted for, those of other embodiments.

The present description addresses methods and apparatus present for identifying subterranean structures using amorphous metal markers associated with the structures. In many examples, the amorphous metal marker will include one or more sections of an amorphous metal foil within a protective enclosure sufficient to prevent contact between surrounding Earth and the amorphous metal foil, which could cause corrosion or other degradation of the amorphous metal foil.

The amorphous metal foil marker will be sized relative to the intended installation to result in a localized variation in the Earth's magnetic field of a selected magnitude which can be detected. In many examples, such detection may be performed using a magnetic gradiometer. As will be described below, in some examples the amorphous metal foil marker may be attached to the subterranean structure, while in other examples the amorphous metal foil marker may be placed proximate the subterranean structure (in many examples, directly above the subterranean structure). For purposes of the present description, the new amorphous metal markers will be described in context of identifying the location of a non-metallic conduit, such as, for example as noted above, PVC or polyethylene pipe or conduit, as identification of such non-metallic pipe has been a long-standing problem. Again as noted above, other non-metallic structures (or merely non-magnetic structures) may be identified in an analogous manner.

The term amorphous metal is used herein refers to metal alloy solids that lack a crystalline atom structure, and which include a "relatively high magnetic relative permeability," which in the context of the present description identifies a magnetic relative permeability between 50,000 and 1,000,000. Such relatively high magnetic permeability may be compared, for example, to a magnetic relative permeability of copper (Cu) of about 1, and of iron (Fe) of about 5,000. Some amorphous metal alloys include either iron and/or cobalt (Co) in combination with Boron (B) and/or Silicon (Si). Though many other amorphous metal alloys with other compositions are known, amorphous metal alloys with these components offer high magnetic susceptibility.

The present description describes amorphous metal foil tapes extending in "generally vertical" and "generally horizontal" orientations. It should be understood that the terms are used to described orientation of a flexible tape in an Earth formation, and thus the terms are used as a general indication of orientation and not a suggestion of a specific angular orientation, or relative to the specific surface of the earth directly above a measurement location. As a result, the amorphous metal foil marking tape is considered to extend "generally vertically" if plane of the tape at a location in question lies at an angle within 45° to either direction of a vertical line relative to the generalized contours of the Earth's surface proximate the location of a portion of the tape in question; and similarly is considered to extend "generally horizontally" if the plane of the tape lies at an angle between 45° and 135° relative to such a vertical line. As a specific example, referring to FIG. 5B, the figure depicts a segment of amorphous metal foil tape 510 extending along an axis that is vertical (and generally perpendicular) to the undisturbed Earth's surface indicated at 514 and not with reference to the piled soil as indicated at 516.

Referring now to FIG. 1, the figure depicts an example installation 100 including an amorphous metal marker, in the form of a tape 102, in one intended application. Amorphous metal marker tape 102 is placed in spaced relation above a non-metallic pipe 104 within the Earth 106. Amorphous metal marker tape 102 is of a generally planar form, though flexible, and extends above at least a portion of the path of the non-metallic pipe 104. In many installations, it will be desirable to have such an amorphous metal marker tape extending for essentially the entire distance that a non-metallic pipe extends beneath the Earth's surface.

Located above the Earth's surface 108 is a detector 110. Detector 110 may be selected from many types, including detectors for real time location operations, or, alternatively, other detecting systems having a detector to collect data (commonly correlated with GPS-derived location information associated with the collected data) which will be processed subsequently to identify the location of subterranean structures.

Though many types of detectors may be utilized with amorphous metal markers of the example configurations and characteristics as described herein, a significant advantage of the described system is that, for many applications utilizing real time detection, a relatively simple detector—a magnetic gradiometer—may be utilized instead of more complex and more expensive detectors. Because the described system measures a localized change in the Earth's magnetic field resulting from presence of the high magnetic permeability amorphous metal, the system does not require matching tuning between a frequency of a detector and a frequency response characteristic of the marker. As a result, the currently described systems are well suited for detection without specialized knowledge of the marking system utilized. An example magnetic gradiometer suitable for use with systems as described herein is the DML2000XRM model from Dunham & Morrow, Inc. of Kearneysville, W. Va. In general, such magnetic gradiometer use two (or more) spaced vector magnetic field sensors (such as fluxgate magnetometers) to measure anomalies along a selected axis. For many applications, a magnetic gradiometer capable of reading from 0 to 20 milliGauss (mG), with a resolution of 0.01 mG, or of generally comparable measurement capabilities, will be suitable. With such a detector, the detection threshold for real time locating is approximately 1 to 2 mG.

More complex detectors may be used for real time detection of the amorphous metal marker tape so long as they are capable of identifying the localized distortion of the Earth's magnetic field, but such are not required. Additionally, to the extent desired for a specific application, either conductive or inductive detectors may be utilized with the described amorphous metal marker tape. As noted above, with a conductive detector, a current must be introduced into the amorphous metal of the amorphous metal marker tape; while for an inductive detector, an alternating signal will be used to induce a current into amorphous metal of the amorphous metal marking tape, thereby generating a magnetic field that may be detected. The amorphous metal marker is both electrically conductive and has high magnetic permeability, which allows it to be detected through conductive and inductive means. Furthermore, this combination of properties makes amorphous foil an ideal target for inductive locating that can result in improved sensitivity compared to conductive-only, non-ferrous markers such as aluminum.

In other applications, where data will be collected for subsequent processing, the detector may take measurements of variations in the Earth's magnetic field in an area of interest, preferably in correlation with a GPS-based location sensor. Such detector systems are known to persons skilled in the art and may include movable land-based systems, such as handheld or wheeled detectors (either moved by hand or vehicles) interrogating the earth in the region of the detector, and associating detection data with GPS data and either recording the data in the unit, or transmitting the detection data and GPS data to a data repository. In other examples, the detector may be airborne, such as carried by a plane or unmanned aerial vehicle (drone). The choice of the detector configuration will often be based on the sum of the distances of all traverses necessary to survey the area of interest; the necessary traverses being a function of the width surveyed by each traverse and the resolution required for the survey. In general, a ground-based magnetic field detector may be desirable for applications having a line survey of less than approximately 60 line-miles; a drone-based magnetic field detector may be desirable for applications requiring a survey up to approximately 1250 line miles; and a (manned) plane-based detector may be desirable for applications requiring a survey over approximately 1250 line miles. With such post-collection processing of magnetic field data, providing the capability of examining patterns in the data to identify magnetic field distortions, it may be possible to reduce the detection threshold, for example, to a range of 0.05 to 0.1 mG. As a result, using such post-collection processing techniques effectively enabling a lower detection threshold, magnetic field distortions at a greater depth from the Earth's surface may be identified.

Figure 2A:
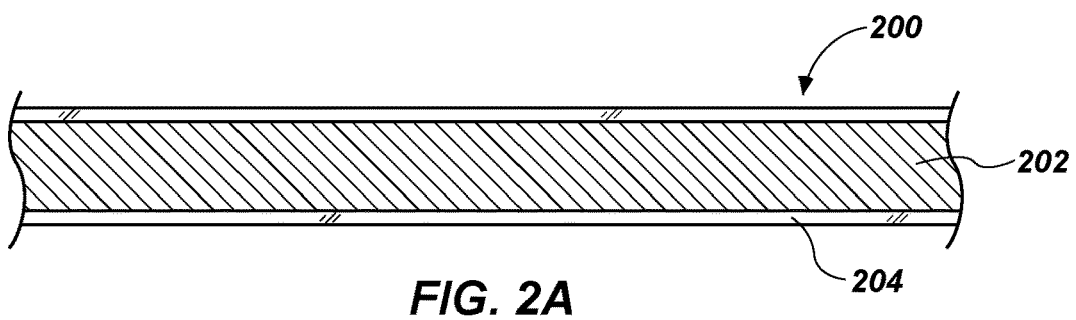
FIGS. 2A-2B each depict a respective example embodiment of an example amorphous metal foil marking tape.
Figure 2B:
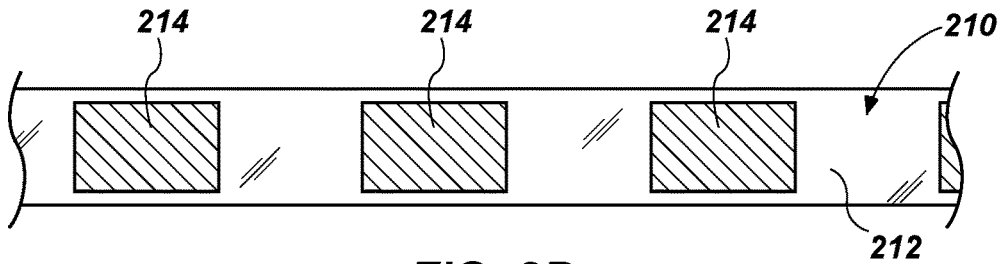

Referring now to FIGS. 2A-B, each figure depicts a respective example embodiment of an example amorphous metal foil marking tape that may be used, for example, in installation such as that described relative to FIG. 1. The term "amorphous metal foil marking tape," will be utilized to identify any of the various forms described herein which include an amorphous metal foil within some form of protective enclosure, as described below. Thus, the term is applicable to the structures of FIGS. 2A-B, as well as to those of any of FIGS. 3A-C.

FIG. 2A depicts a length of amorphous metal foil marking tape 200 having a generally continuous layer of amorphous metal foil 202, encased within a protective enclosure 204. In many examples, the protective enclosure will be formed of layers of polymer film laminated around the amorphous metal foil 202. Additionally, in many examples the polymer film or other materials of the protective enclosure will be colored so as to be highly visible; and in some cases the color may be coded in accordance with the type of conduit (or other structure) being marked. In some cases, textual information may be added to the colored laminate (or other material forming some portion of the enclosure).

Different thicknesses of amorphous metal foil may be used such amorphous metal foil marking tape 200, with foil of 0.001 inch thickness being determined to be sufficient for many applications. In general, an amorphous metal foil having a thickness between approximately 0.0005 inch and 0.002 inch will be desirable for use in the amorphous metal foil marker tape. Amorphous metal foil 202 is described herein as a generally continuous layer in view of it extending predominantly across the entire length of a section of marking tape; but it should be understood that the amorphous metal foil 202 may be formed of different segments of amorphous metal foil placed sequentially with the end of one segment near the end of another segment, but the different segments do not need to physically contact one another, as electrical conductivity through the amorphous metal foil is not required for the systems described herein. In this regard, amorphous metal foil marker tape having spaced segments of amorphous metal foil will not be suitable for use with conductive detector systems, but may be used with inductive detector systems.

FIG. 2B depicts an alternative configuration of an amorphous metal foil marking tape 210, which includes multiple spaced segments of amorphous metal foil 214 retained in spaced relation within an enclosure 212. The change from an essentially continuous amorphous metal foil layer, as in FIG. 2A, to a discontinuous layer with multiple segments represents a trade-off between utilizing less of the amorphous metal foil, but with a resulting tape that to some degree (depending on the space between the segments), may cause less localized variation in the Earth's magnetic field, and may be more difficult to manufacture. However, as identified relative to FIG. 8, a segmented amorphous metal foil tape may improve uniformity and consistent polarity of a detected response in some circumstances.

In various examples, the amorphous metal foil marking tapes may be of a desired width across the generally planar surface extending orthogonal to the longitudinal axis of the tape, with widths between approximately 4 inches and approximately 12 inches, being a useful dimension for many applications. In many examples, widths between approximately 5.5 inches and 10 inches will be satisfactory for applications in which the amorphous metal foil marking tapes will be placed separate from, but extending in parallel relation to, an underlying non-metallic conduit (or other structure). As will be apparent to persons of skill in the art having the benefit of this disclosure, narrower tapes may be utilized where the underlying non-metallic conduit will be relatively closer to the Earth's surface (for example, within a foot or less, as may be the case with electrical conduit or irrigation conduit, for example), as compared to conduit that may be disposed more deeply, for example two feet or more beneath the surface.

Another factor potentially influencing the choice of width of the amorphous metal foil marking tapes is the predominant compass direction of the conduit path to be marked. As addressed later herein in reference to FIG. 8, described systems using amorphous metal foil marking tapes result in greater localized disturbance of the Earth's magnetic field when extending in a generally North-South direction, as compared to when extending in an East-West direction. As a result, in marking conduits (or portions thereof) extending predominately in an East-West direction it may be advantageous to use an amorphous metal foil marking tape of an increased dimension to present a similar detectable signal to that seen relative to marking tape extending in a generally North-South direction.

The laminated enclosures for either of amorphous metal foil marking tape 200 or 210 may be of any polymer suitable for providing strength and abrasion resistance sufficient to facilitate handling and placing of the tape, while protecting the tape from exposure to the surrounding Earth and elements when installed. For example, two layers of polyethylene, ranging between 0.002 and 0.004 inches in thickness has been found suitable.

The amorphous metal foil used in the systems described herein can be of many types known to persons skilled in the art. Tests have been performed with several amorphous foil alloys available from Metglas Inc., of Conway, S.C., using both iron and cobalt-based metallurgies, with characteristics as set forth below in Table 1:

| Alloy | Induction, T at an Applied Field of 800 A/m | Relative Magnetic Permeability | Composition |
|---|---|---|---|
| 2605CO | 1.15 | 156,400 | Fe—Co—B |
| 2605HB1M | 0.958 | 159,900 | Fe—B—Si |
| 2605SA1 | 0.829 | 67,890 | Fe—B—Si |
| 2705M | 0.754 | 929,300 | Co—B—Si |
| 2714A | 0.602 | 190,000 | Co—B—Si |

The above characteristics are based in the on the metal foil in an as-cast state (i.e. without a secondary annealing cycle). Based upon comparisons of the detectability of sample structures with each of the identified alloys, each of the above alloys provided similar detectability. Although a secondary annealing cycle can result in increased brittleness of the amorphous metal foil separations that might impact the electrical conductivity through the amorphous metal foil, such breaks electrical conductivity are not of concern for the presently described systems.

Figure 6:
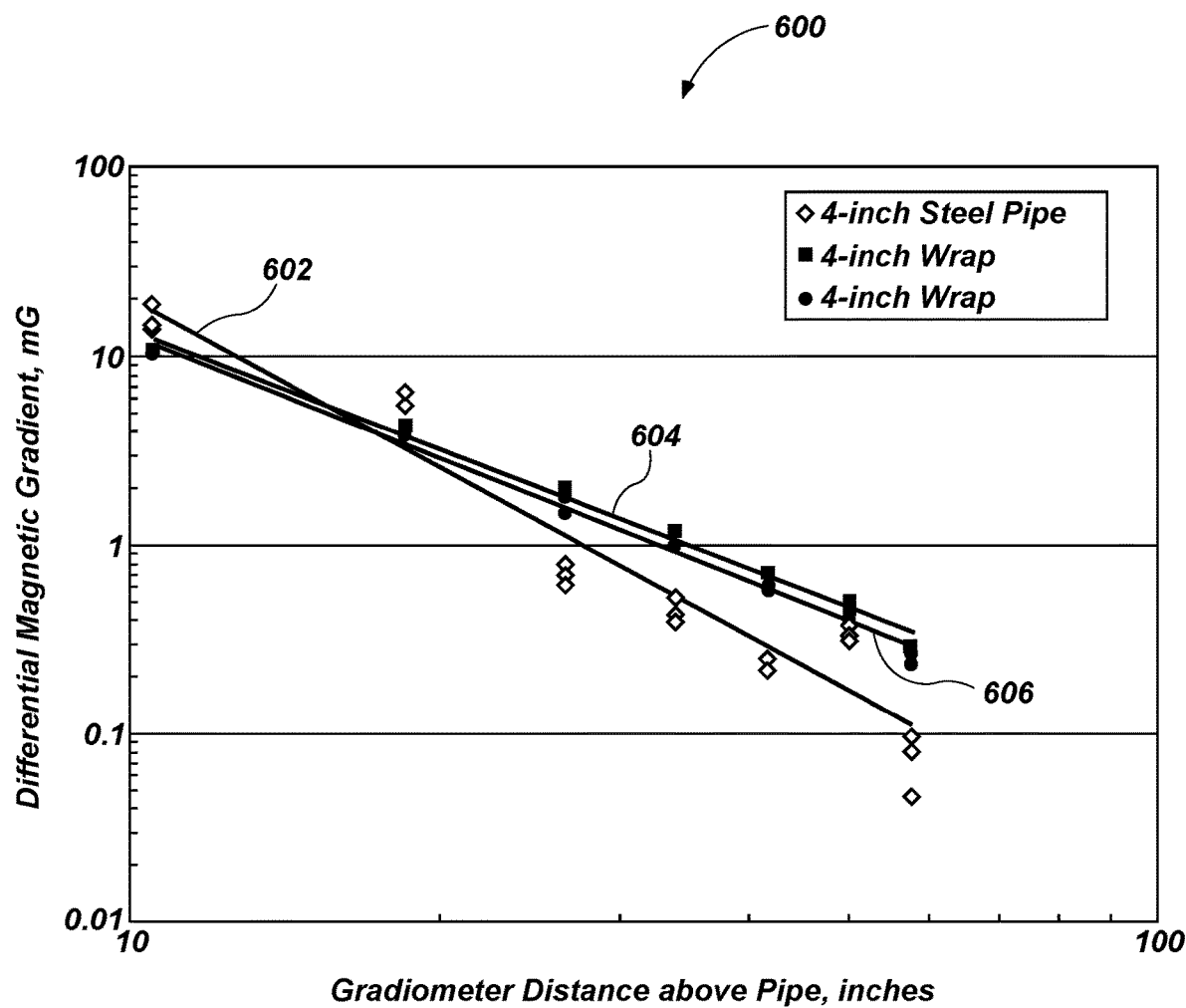
FIG. 6 graphically depicts a comparison of detectable differential magnetic gradients of different conduit constructions as a function of depth.

Referring now also to FIG. 6, the figure graphically depicts a comparison 600 of detectable differential magnetic gradients of two of the above amorphous metal foils to a steel pipe, each as a function of distance to the detecting gradiometer. Trend line 602 generally represents a 4-inch National Pipe Thread (NPT) steel pipe, while trend line 604 generally represents a 4-inch non-metallic pipe wrapped with the identified 2605HB1M Fe—B—Si alloy; and trend line 606 generally represents a 4-inch non-metallic pipe wrapped with the identified 2705M Co—B—Si alloy. Notwithstanding the generally higher magnetic permeability of the 2705 alloy over that of the 2605HB1M alloy (929,300 to 159,900), there was minimal difference in detectability.

Figure 3A:
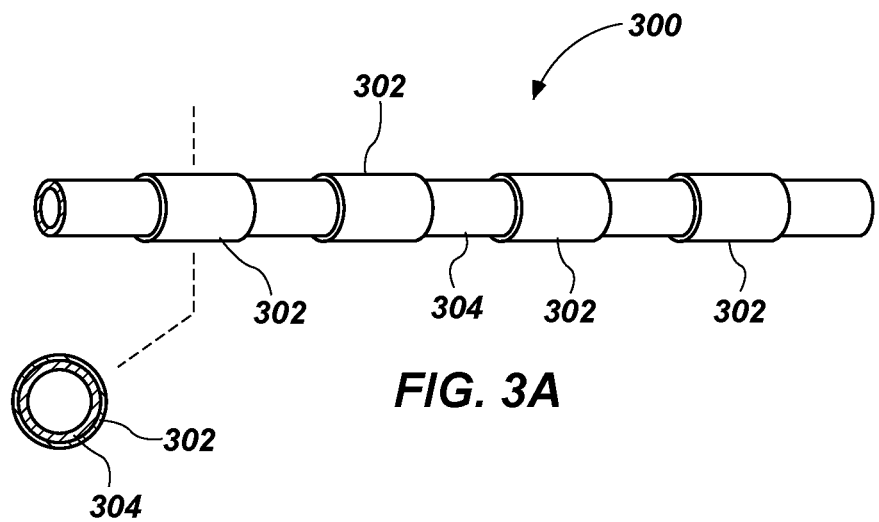
Figure 3B:
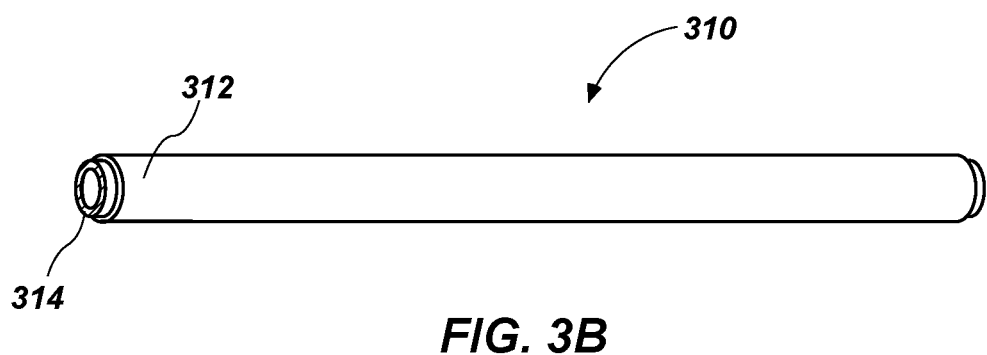
Figure 3C:
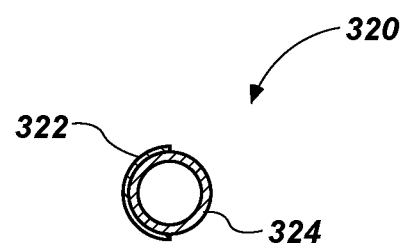

In other example systems, the amorphous metal foil marking tape may be secured to the conduit (or other structure). Referring now to FIGS. 3A-C, each represents an example configuration in which an amorphous metal foil marking tape is applied to an example conduit. FIG. 3A depicts an example configuration 300 in which multiple segments of amorphous metal foil marking tape 302 each extend circumferentially around a non-metallic conduit 304 at spaced intervals. The relative thickness of the amorphous metal foil marking tape is exaggerated in the figure for purposes of illustration. As shown in the inset cross-section, in the depicted example, the segments of amorphous metal foil marking tape 302 extend completely around the circumference of conduit 304. In some examples, the circumferential bands of each marking tape segment 302, may extend, for example, between approximately 8 inches and approximately 2 feet along conduit 304

In example configuration 300, the circumferential segments of amorphous metal foil tape are essentially evenly spaced along the depicted length of conduit 304. In other applications, the circumferential segments of amorphous metal foil marking tape may be unevenly spaced, so as to provide a directional indication that may be easily detected. For example, as just one example of such a system, a system may include two (or more) include segments of amorphous metal foil marking tape in relatively closely spaced relation with one another (for example within 1 to 1.5 feet of one another), and with the next pair (or group) of segments spaced approximately 6 to 10 feet away An advantage of example systems utilizing bands of the amorphous metal foil marking tape extending circumferentially around a conduit result from the relatively large impact of the structure on the Earth's gravitational field. Referring now also to FIGS. 4A-C, those figures depict comparative magnetostatic modeling of the distortion caused by a pipe cross-section in the Earth's magnetic field, in which: FIG. 4A depicts modeled distortion resulting from a 4-inch iron pipe; FIG. 4B depicts distortion resulting from a 50 µm shell of cast-iron around a 4-inch non-metallic pipe diameter; and FIG. 4C depicts distortion resulting from a 50 µm shell of an amorphous metal film around a 4-inch non-metallic pipe diameter.

As can be seen from a comparison of FIG. 4C to FIG. 4A, the 50 µm amorphous metal film provide a generally equivalent distortion of the Earth's magnetic field to that provided by a comparably sized cast-iron pipe. Additionally, the distortion is much greater than that provided by a 50 µm cast-iron sleeve due to the substantially greater magnetic permeability of the amorphous metal, 80,000 versus 4,000 (typical permeability values that were used in the modeling). However, it should be noted that for smaller size structures, for example three-quarter inch or 1 inch diameter polyethylene or PVC pipe or tubing, the dimensions of a circumferential band of amorphous metal foil may not create sufficient distortion of the Earth's magnetic field to facilitate reliable detection, and therefore use of an amorphous metal foil marking tape separate from the pipe structure may be desirable for such applications.

Referring now to FIG. 3B, the figure depicts an embodiment 310 in which amorphous metal tape 312 extends circumferentially around and continually along a section of a non-metallic conduit 314. Assuming the non-metallic conduit 314 is of sufficient diameter, as can be seen from the modeling of FIGS. 4A-C, the wrapping of the amorphous metal tape may more closely approximate the signature of an iron pipe; however, such an approach utilizes a relatively maximum volume of amorphous metal foil tape.

As an alternative approach, FIG. 3C depicts an alternative configuration 320 in which an amorphous metal foil marking tape 322 is secured adjacent a vertically defined half-circumference of a non-metallic conduit 324. As discussed in more detail in reference to FIG. 7, evaluation performed to this point suggests that relatively greater disruption of the Earth's magnetic field results from generally vertical planar structures (i.e. planar structures extending generally vertically), in contrast, for example, to generally horizontally extending planar structures.

In circumstances in which the amorphous metal foil marking tape assumes a more vertically curvilinear form, as in FIG. 3C, it appears that greater disruption of the Earth's magnetic field results from orientations of the amorphous metal foil that provide the greatest vertical dimension. For example, the configuration 320 is believed to provide greater disruption of the Earth's magnetic field than would be provided by an embodiment with amorphous metal foil tape extending over a different half circumference of conduit 324 (for example, a half circumference radially offset by 90° from that depicted in FIG. 3C), and thereby having a lesser vertical dimension.

Figure 11:
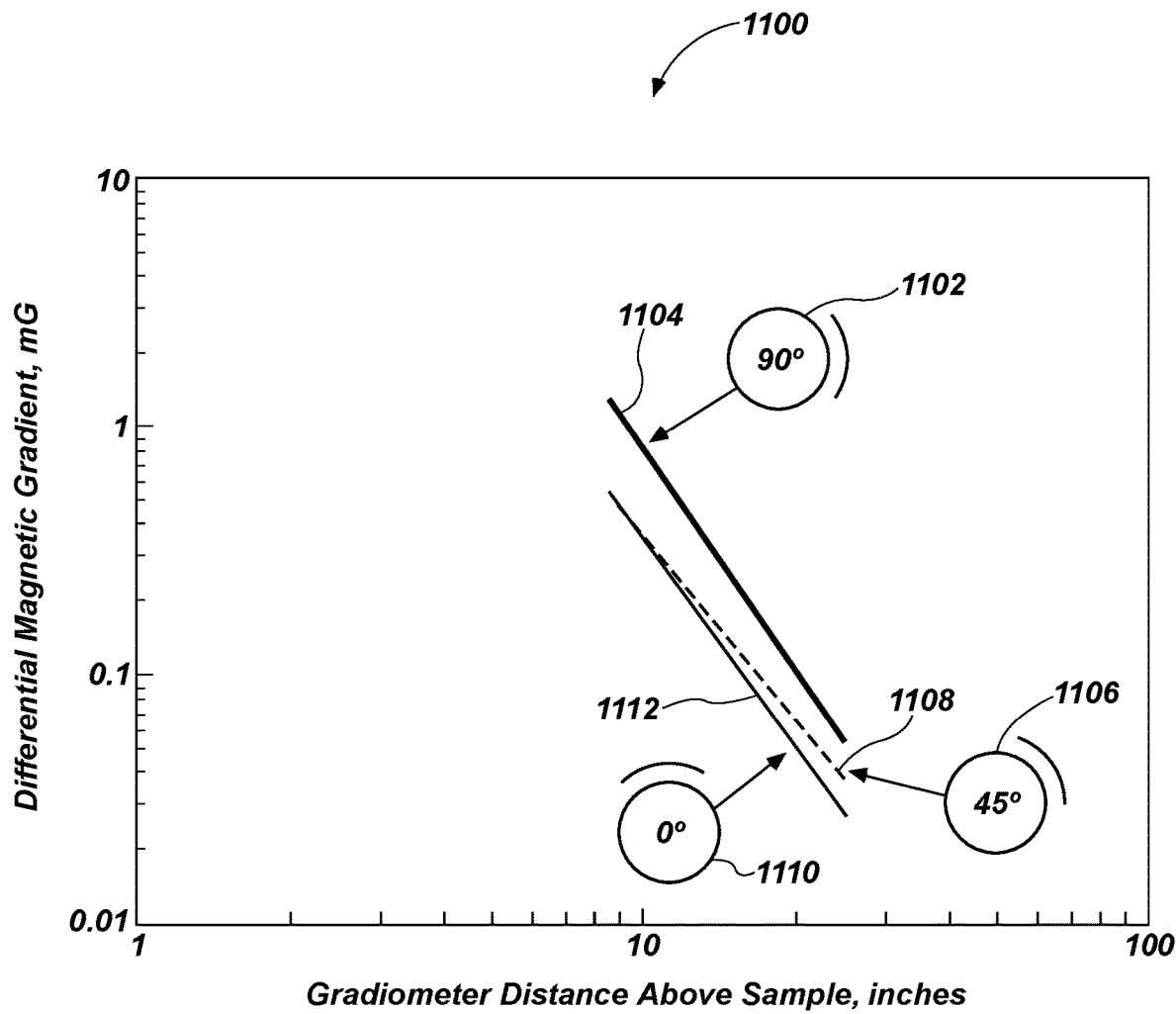
FIG. 11 depicts trend lines of differential magnetic gradients resulting from an amorphous metal strip oriented in different positions relative to the exterior of non-magnetic pipe.

The impact of the orientation of a curvilinear section of amorphous metal foil is depicted in FIG. 11. The figure depicts trend lines of the differential magnetic gradient resulting from a 1-inch wide strip oriented in different positions relative to the exterior of a 1-inch PVC pipe. In a first orientation 1102, in which the tape is arranged to provide the greatest vertical dimension, the corresponding trend line 1104 indicates the greatest differential gradient. In orientation 1106, trend line 1108 depicts a reduced gradient;

and orientation 1110, offering the minimal vertical dimension, results in trend line 1112, defining a further reduced magnetic gradient.

Referring now to FIGS. 5A-B, the figures depict alternative placements of an amorphous metal film in contemplated applications, in which FIG. 5A depicts installation 500 of an amorphous metal marker tape 502 in a generally horizontal orientation above a non-metallic conduit 506 in a formed (and filled) trench 504 in the Earth 508; and FIG. 5B depicts installation of an amorphous metal marker tape 510 in a generally vertical orientation above a non-metallic conduit 512 in a plowed recess. As noted above, the horizontal orientation will result in less localized change in the Earth's magnetic field to facilitate detection, but may be adequate for many applications particularly depending upon the presence (or absence) of sources of background disruptions, the depth of the tape, etc. A trench 504 as depicted may be formed by conventional trench digging devices.

Vibratory and static plows are used with conventional marking tapes to open a furrow, and to subsequently simultaneously feed a PVC conduit into the furrow, while allowing the conventional marking tapes to feed into the furrow above the conduit. With such conventional marking tapes, the orientation of the marking tapes is of little significance since they are merely intended to provide a visual warning once digging is underway. As discussed in more detail relative to FIG. 9, a plow structure is contemplated which facilitates feeding an amorphous metal foil marking tape into a furrow in a generally vertical orientation, as depicted in FIG. 5B. Due to the tendency of the furrow to close on itself after passage of the plow blade, maintaining generally vertical orientation of the amorphous metal foil marking tape may be easier in a plowed furrow.

Figure 7:
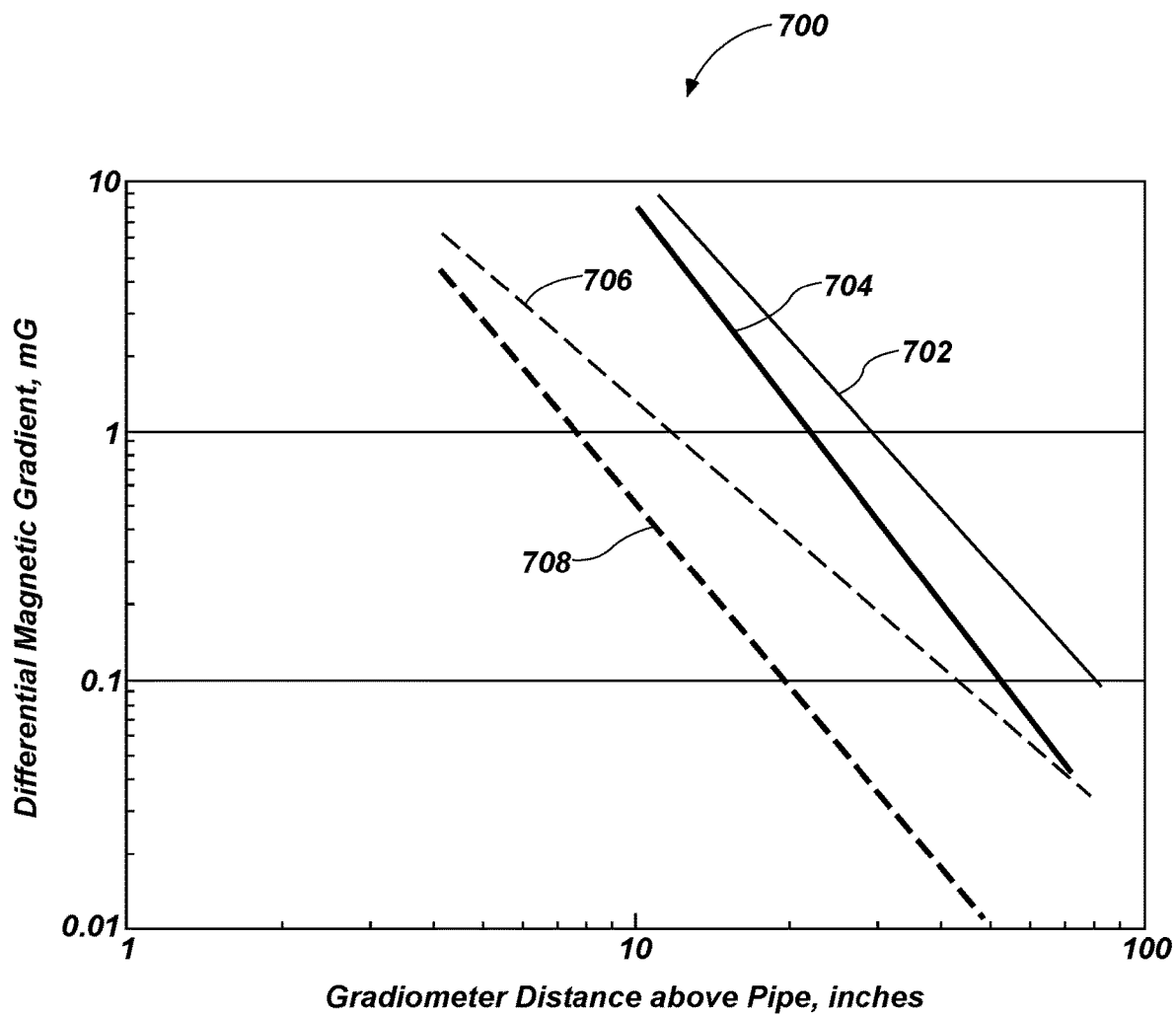
FIG. 7 graphically depicts a comparison of detectable differential magnetic gradients of selected configurations of different configurations of amorphous metal foil tape as a function of orientation and of depth.

FIG. 7 graphically depicts a comparison 700 of detectable differential magnetic gradients of selected configurations of different configurations of amorphous metal foil marking tape (each having a strip of amorphous metal foil with a width of 6 inches) as a function of orientation and of distance from a detecting gradiometer. Trend line 702 generally represents the magnetic gradient of a 36 inch length of the amorphous metal foil marking tape when placed in a vertical orientation (generally as depicted in FIG. 5B); while trend line 704 represents the magnetic gradient of a 36 inch length of the same dimension of amorphous metal foil marking tape when placed in a horizontal orientation (generally as depicted in FIG. 5A). Trend line 706 represents the magnetic gradient of a 12-inch long vertical strip when placed in a vertical orientation; as compared to trend line 708 representing the magnetic gradient of the 12-inch long vertical strip placed in a horizontal orientation. As indicated by comparison 700, with other factors being consistent, use of longer segments of amorphous metal foil improves detectability over relatively shorter segments; and placing segments of amorphous metal foil in a generally vertical orientation improves detectability over foil in a generally horizontal orientation.

Figure 8:
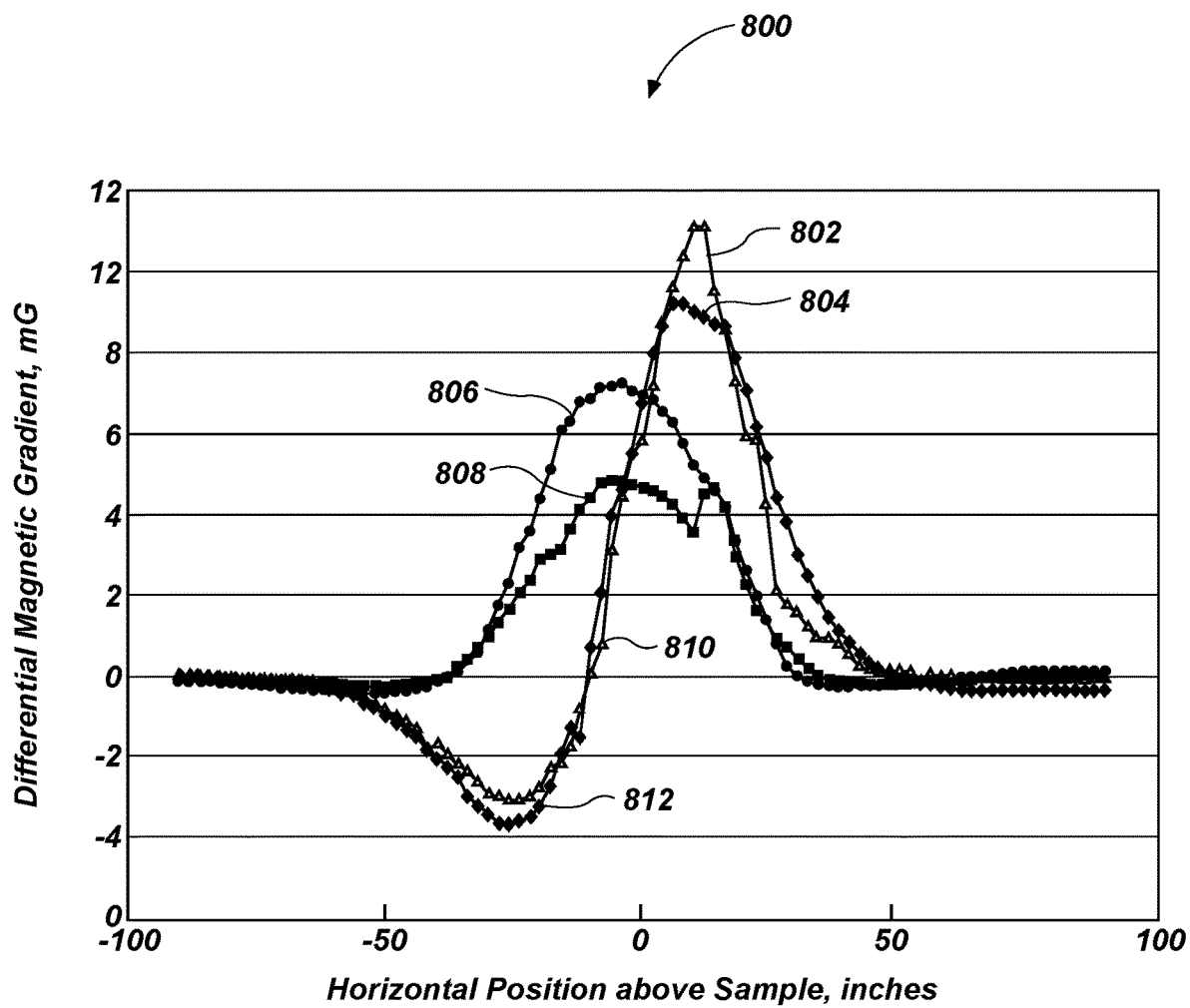
FIG. 8 graphically depicts a comparison of detectable differential magnetic gradients of two different widths of amorphous metal foil tape as a function of compass reference orientation (North-South, and East-West).

As noted previously, the orientation of a length of amorphous metal foil marking tape relative to the magnetic north-south axis affects the peak magnetic distortion resulting from the tape, and thus the detectability of the tape. Referring now to FIG. 8, the figure graphically depicts a comparison 800 of two different widths of amorphous metal foil marking tape (all strips 36 inches long, and each oriented vertically) as a function of compass reference orientation (North-South, and East-West). Curve 802 depicts the differential magnetic gradient of a 10-inch wide amorphous metal foil strip disposed along a North-South axis; while curve 804 depicts the differential magnetic gradient of an 8-inch wide amorphous metal foil strip disposed along a North-South axis. In contrast, curve 806 depicts a 10-inch wide amorphous metal foil strip disposed along an East-West axis, while curve 808 depicts an 8-inch wide amorphous metal strip disposed along an East-West axis. As can be seen from comparison 800 the peak differences in the differential magnetic gradient between the two different widths of amorphous metal strips differed from one another by approximately 17% in the North-South orientation, but differed from one another by approximately 32% in the East-West orientation. Additionally, the peak differences in the differential magnetic gradient between similar width strips differed by approximately 35% for the 10 inch widths oriented North-South versus East-West, but by approximately 47% for the same comparison of 8 inch widths. As a result, some example installations may benefit from use of a greater dimension (i.e., width) of amorphous metal foil marking tape when extending in a compass orientation closer to an East-West orientation than to a North-South orientation (i.e., extending along an axis within a range between a NW-SE axis, and a SW-NE axis).

Figure 10:
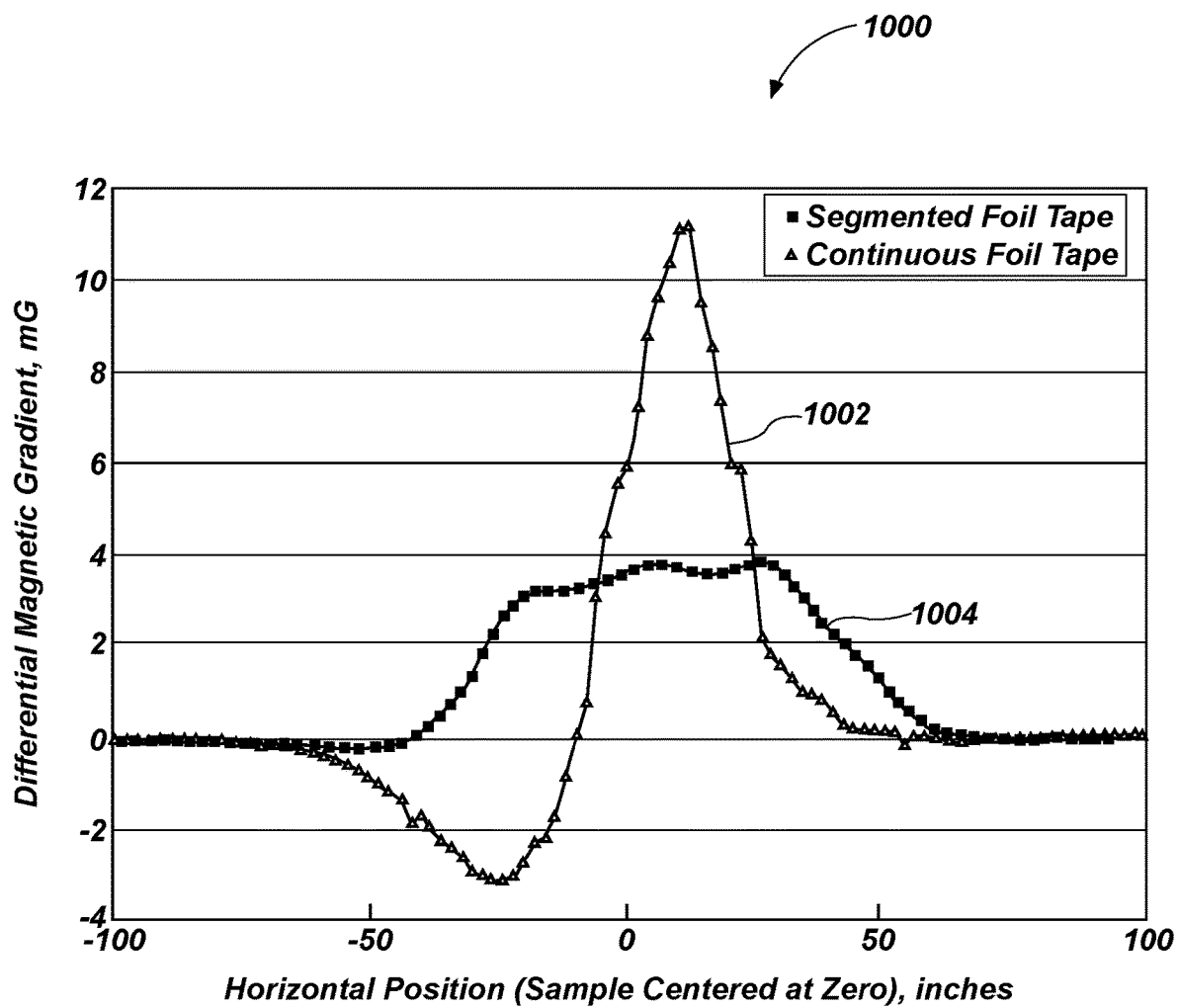
FIG. 10 depicts a comparison 1000 of the differential magnetic gradient of amorphous metal marking tapes of different configurations extending in the North-South orientation.

An evaluation of different configurations of amorphous metal foil marking tape have identified that use of a marking tape having spaced segments of amorphous metal foil in linearly spaced relation to one another, as in FIG. 2B, can eliminate the variation in signal strength and polarity associated with a solid amorphous metal foil marking tape (e.g. FIG. 2A) oriented North-South as reflected in FIG. 8, at curves 802 and 804 at 810 and 812. Referring now also to FIG. 10, the figure depicts a comparison 1000 of the differential magnetic gradient of amorphous metal marking tapes extending in the North-South orientation, comparing a continuous foil tape represented by curve 1002, to a segmented foil tape (one foot lengths of amorphous metal foil spaced at one foot intervals), represented by curve 1004.

Figure 9:
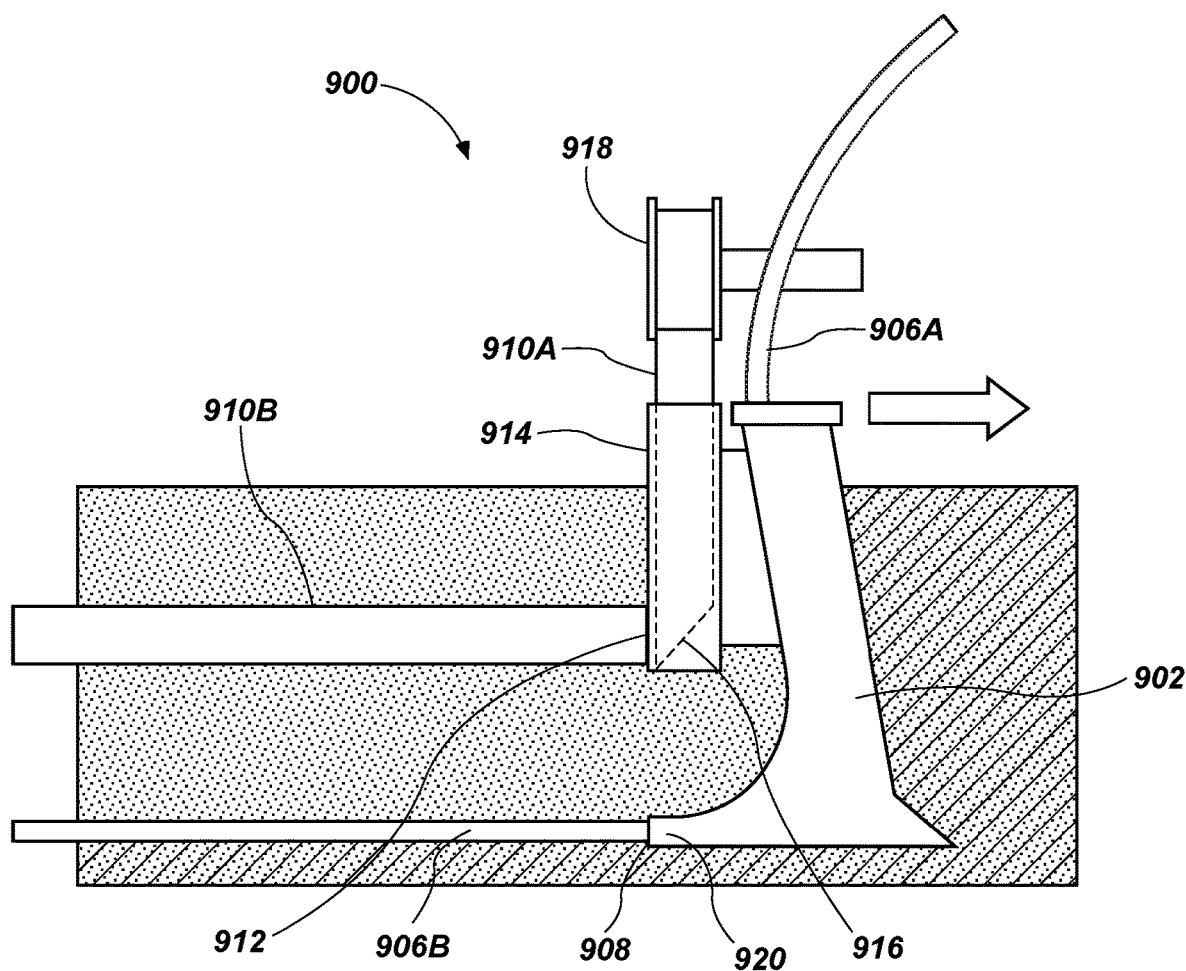
FIG. 9 schematically depicts a vibratory plow suitable for achieving the installation depicted in FIG. 5B.

FIG. 9 schematically depicts a plow 900 suitable for achieving the installation depicted in FIG. 5B. Plow 900 is configured for movement by a tractor or similar vehicle, and includes a plow blade 902 configured to create a furrow through longitudinal movement; and in some examples may also incorporate vibratory energy (such as may be created through a power take off (PTO) vibrating mechanism in a support assembly coupled to plow 900). Plow 900 includes a conduit feed passage, indicated generally at 920, for receiving a flexible conduit through an upper portion of the plow, as indicated at 906A, and feeding the conduit to an exit 908 at the back of the plow blade 902 allowing the conduit to be placed toward a lower portion of the formed furrow, as indicated at 906B. Plow 900 also includes a marking tape feed path, indicated generally at 914, which receives a feed supply of marking tape as indicated at 910A and allows the marking tape to be fed to an exit indicated generally at 912 to be placed in the furrow at a vertically spaced position above conduit 906B, as indicated at 910B. Unlike conventional plow conduit placement systems, plow 900 includes a feed path 914 configured to turn the marking tape at a roller or guide assembly, indicated schematically at 916, to place the tape in the vertical orientation, identified as the preferable orientation, as discussed above. In some example systems the marking tape may be contained in a spool mounted on the plow, as indicated at 918; or another systems the marking tape may be on a spool at another location, for example mounted on a conveying tractor coupled to plow 900. In some such embodiments, an orienting roller to receive and guide the tape into the plow may be used instead of spool 918.

To better illustrate the methods and apparatuses described herein, a non-limiting set of example embodiments are set forth below as numerically identified examples:

Example 1 is a subterranean installation, comprising: a non-metallic structure covered by some dimension of Earth, hiding the location of the structure; and a marking tape disposed in proximity to the non-metallic structure, the marking tape comprising, an amorphous metal foil layer, and a protective covering preventing direct contact between the amorphous metal foil layer and the surrounding Earth.

In Example 2, the subject matter of Example 1 wherein the non-metallic structure comprises PVC pipe.

In Example 3, the subject matter of any one or more of Examples 1-2 wherein the marking tape is attached to the non-metallic structure.

In Example 4, the subject matter of any one or more of Examples 1-3 wherein the marking tape extends in the direction of the non-metallic structure and in spaced relation above the non-metallic structure.

In Example 5, the subject matter of any one or more of Examples 1-4 wherein the non-metallic structure is a non-metallic pipe, and wherein multiple pieces of marking tape are arranged in spaced relation to one another a long at least a portion of the non-metallic pipe.

In Example 6, the subject matter of any one or more of Examples 1-5 wherein the multiple pieces of marking tape extend around at least a portion of the circumference of the non-metallic pipe.

In Example 7, the subject matter of any one or more of Examples 1-6 wherein the protective covering comprises a polymer film laminated around the amorphous metal foil layer.

In Example 8, the subject matter of any one or more of Examples 1-7 wherein the protective covering comprises a polyethylene film.

In Example 9, the subject matter of any one or more of Examples 7-8 wherein the protective covering includes a colored material for improved visibility.

In Example 10, the subject matter of any one or more of Examples 1-9 wherein the amorphous metal foil has a magnetic relative permeability greater than 50,000.

In Example 11, the subject matter of any one or more of Examples 1-10 wherein the amorphous metal foil comprises an alloy including at least one of iron (Fe) and cobalt (Co).

In Example 12, the subject matter of any one or more of Examples 1-11 wherein the amorphous metal foil has a thickness between 0.0005 inch and 0.002 inch.

Example 13 is a method of forming a subterranean installation, comprising: placing a non-metallic structure within a recess within the Earth; and placing a marking tape in proximity to the non-metallic structure, the marking tape comprising, an amorphous metal foil layer, and a protective covering preventing direct contact between the amorphous metal foil layer and the surrounding Earth.

In Example 14, the subject matter of Example 13 wherein the non-metallic structure comprises PVC pipe.

In Example 15, the subject matter of any one or more of Examples 13-14 wherein placing a marking tape in proximity to the non-metallic structure comprises attaching the marking tape to the non-metallic structure.

In Example 16, the subject matter of any one or more of Examples 13-15 wherein placing a marking tape in proximity to the non-metallic structure comprises placing the marking tape in spaced relation above the non-metallic structure.

In Example 17, the subject matter of any one or more of Examples 13-16 wherein the non-metallic structure is a non-metallic pipe, and wherein multiple pieces of marking tape are arranged in spaced relation to one another a long at least a portion of the non-metallic pipe.

In Example 18, the subject matter of Example 17 wherein the amorphous metal is contained within a continuous section of amorphous metal marking tape, wherein the marking tape comprises a section with multiple amorphous metal foil pieces arranged in linearly spaced relation to one another along the portion of the non-metallic pipe.

In Example 19, the subject matter of any one or more of Examples 13-18 wherein the multiple pieces of marking tape extend around at least a portion of the circumference of the non-metallic pipe.

In Example 20, the subject matter of any one or more of Examples 13-19 wherein the protective covering comprises a polymer film laminated around the amorphous metal foil layer.

In Example 21, the subject matter of Example 20 wherein the polymer film comprises a polyethylene film.

In Example 22, the subject matter of any one or more of Examples 13-21 wherein the amorphous metal foil has a magnetic relative permeability of 50,000 or greater.

Example 23 is a method of identifying the location of an underground non-metallic conduit, comprising: measuring a localized variation in the Earth's magnetic field through use of a magnetic gradiometer; and wherein the localized variation in the Earth's magnetic field is caused by an amorphous metal foil marker placed proximate at least a portion of the underground non-metallic conduit, wherein the amorphous metal foil marker includes an area of amorphous metal foil sufficient to establish a selected degree of localized variation in the Earth's magnetic field, the amorphous metal foil retained within protective enclosure.

In Example 24, the subject matter of Example 23 wherein the amorphous metal foil marker is configured to establish the localized variation in the Earth's magnetic field in the absence of any introduction of current to the metal foil.

In Example 25, the subject matter of any one or more of Examples 23-24 wherein the amorphous metal foil marker is attached to the non-metallic conduit.

In Example 26, the subject matter of Example 25 wherein the amorphous metal foil marker extends around at least a portion of a transverse cross-section through the non-metallic conduit.

In Example 27, the subject matter of any one or more of Examples 23-26 wherein the amorphous metal foil marker is placed above the at least a portion of the underground non-metallic conduit and extending along the path of the conduit.

In Example 28, the subject matter of Example 27 wherein the amorphous metal foil marker is a generally flat structure, with the width extending generally vertically relative to the Earth's surface.

In Example 29, the subject matter of any one or more of Examples 27-28 wherein the measuring a localized variation in the Earth's magnetic field is performed to identify the localized variation in real time.

In Example 30, the subject matter of any one or more of Examples 27-29 wherein measuring a localized variation in the Earth's magnetic field comprises: collecting magnetic field strength data correlated with GPS positioning data; and after collection of the magnetic field strength data and GPS data, analyzing the data to identify field strength variations consistent with an amorphous metal foil marker.

In Example 31, the subject matter of Example 30 wherein collecting magnetic field strength data correlated with GPS positioning data is performed through use of a hand-held detector.

In Example 32, the subject matter of any one or more of Examples 30-31 wherein collecting magnetic field strength data correlated with GPS positioning data is performed through use of a wheeled detector movable across the Earth's surface.

In Example 33, the subject matter of any one or more of Examples 30-32 wherein collecting magnetic field strength data correlated with GPS positioning data is performed through use of an airborne detector.

In Example 34, the subject matter of any one or more of Examples 30-33 wherein the airborne detector is supported by an unmanned aerial vehicle.

In Example 35, the subject matter of any one or more of Examples 30-34 wherein the airborne detector is supported by an airplane.

In Example 36, wherein the method of any one or more of Examples 23-35 are performed on a subterranean installation in accordance with any of Examples 1-12.

In Example 37, wherein the method of forming a subterranean installation of any of Examples 13-22, is used to produce a subterranean installation in accordance with any of Examples 1-12.

In Example 38, wherein the method of any one or more of Examples 23-35 are performed on a subterranean installation formed in accordance with any one or more of Examples 13-22.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. In addition, in the above Detailed Description, various features have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A subterranean installation, comprising:
   a non-metallic structure covered by some dimension of Earth, hiding the location of the structure; and
   a marking tape disposed in proximity to the non-metallic structure, the marking tape comprising,
      an amorphous metal foil layer extending in a direction of the non-metallic structure, wherein the amorphous metal foil has a magnetic relative permeability greater than 50,000, and
      a protective covering preventing direct contact between the amorphous metal foil layer and the surrounding Earth; and
   wherein the non-metallic structure is a non-metallic pipe, and wherein multiple pieces of amorphous metal foil of the marking tape are arranged along the direction of the non-metallic pipe and extend around at least a portion of the circumference of the non-metallic pipe.

2. The subterranean installation of claim 1, wherein the non-metallic structure comprises PVC pipe.

3. The subterranean installation of claim 1, wherein the marking tape is attached to the non-metallic structure.

4. The subterranean installation of claim 1, wherein the marking tape extends in spaced relation above the non-metallic pipe.

5. The subterranean installation of claim 1, wherein the multiple pieces of marking tape are arranged in spaced relation to one another along the direction of at least a portion of the non-metallic pipe, with the amorphous metal foil of some pieces of marking tape having a longest dimension extending along the direction of the non-metallic pipe.

6. The subterranean installation of claim 1, wherein the protective covering comprises a polyethylene film.

7. The subterranean installation of claim 1 wherein the amorphous metal foil comprises an alloy including at least one of iron (Fe) and cobalt (Co).

8. The subterranean installation of claim 1, wherein the amorphous metal foil has a thickness is between 0.0005 inch and 0.002 inch.

9. The subterranean installation of claim 1, wherein the protective covering comprises a polymer film laminated around the amorphous metal foil layer, and wherein the amorphous metal foil layer is electrically conductive.

10. The subterranean installation of claim 9, wherein the protective covering includes a colored material for improved visibility.

11. A method of forming a subterranean installation, comprising:
    placing an elongated non-metallic structure within a recess within the Earth; and
    placing a marking tape in proximity to the non-metallic structure, the marking tape comprising, an amorphous metal foil layer extending in the direction of the non-metallic structure, wherein the amorphous metal foil has a magnetic relative permeability greater than 50,000, and a protective covering preventing direct contact between the amorphous metal foil layer and the surrounding Earth; and wherein the non-metallic structure is a non-metallic pipe, and wherein multiple pieces of amorphous metal foil of the marking tape are arranged along at least a portion of the non-metallic pipe and extend around at least a portion of the circumference of the non-metallic pipe.

12. The method of forming a subterranean installation of claim 11, wherein the non-metallic pipe comprises PVC pipe.

13. The method of forming a subterranean installation of claim 11, wherein placing a marking tape in proximity to the non-metallic pipe comprises attaching the marking tape to the non-metallic pipe.

14. The method of forming a subterranean installation of claim 11, wherein placing a marking tape in proximity to the non-metallic pipe comprises placing the marking tape in spaced relation above the non-metallic pipe.

15. The method of forming a subterranean installation of claim 11, wherein the multiple pieces of amorphous metal are arranged in spaced relation to one another along at least a portion of the non-metallic pipe.

16. The method of forming a subterranean installation of claim 15, wherein the amorphous metal foil is contained within a continuous section of amorphous metal marking tape, wherein the marking tape comprises a section with multiple amorphous metal foil pieces arranged in linearly spaced relation to one another along a portion of the non-metallic pipe.

17. The method of forming a subterranean installation of claim 11, wherein the protective covering comprises a polymer film laminated around the amorphous metal foil layer, and wherein the amorphous metal foil layer is electrically conductive along the length of the marking tape.

18. The method of claim 17, wherein the polymer film comprises a polyethylene film.

* * * * *